2,885,059
TILTING GRID LOADER

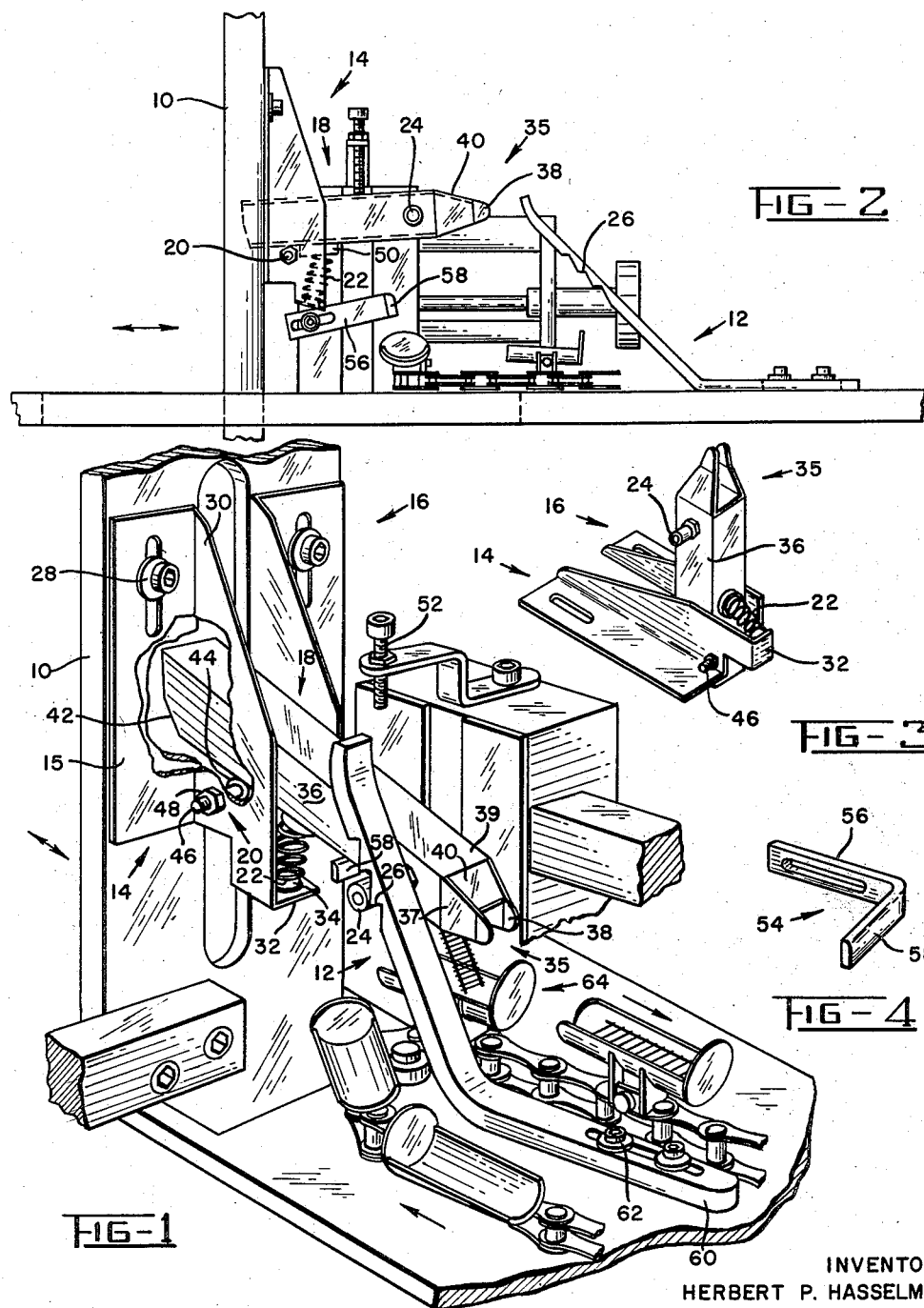

Herbert P. Hasselman and Chester B. Marshall, Lock Haven, Pa., assignors to Sylvania Electric Products Inc., a corporation of Massachusetts Application September 20, 1956, Serial No. 611,064

6 Claims. (Cl. 198—26)

This invention relates to a conveyor attachment for a machine. It is particularly applicable to machines which deliver articles, one by one, from an orificed member which reciprocates to and from an article delivery station.

As an exemplification of the invention, the conveyor attachment is disclosed as applied to the head of a grid making machine which during grid manufacture cuts off individual grids from a string of grids and which head, in the process of grid manufacture of the grids, reciprocates laterally of itself.

An object of the invention is to ensure that the articles falling from the cut off head into the conveyor do not bounce out of the conveyor.

Another object of the invention is to provide for combined tilting and vibratory motion of the chute during its motion with the head toward its delivery station to ensure non-retention of grids in the chute after the chute overlies the grid receiver.

Other objects of the invention will become apparent upon consideration of the following detailed description of the invention.

The chute is attached, in the exemplification disclosed herein, to the reciprocatory grid cut off head as shown, for example, at 60 in the patent to Gartner 2,759,499 issued August 21, 1956, and is adapted to deliver articles to buckets mounted on a conveyor chain which is intermittently indexed to bring successive buckets to grid receiving position, as shown in the drawing and as disclosed more particularly in the patent to Gartner 2,821,825 issued February 4, 1958.

In the accompanying drawings,

Fig. 1 is a perspective view, with parts broken away, showing the association of grid cut off head, chute and grid receiving buckets.

Fig. 2 is a side elevation of the same.

Fig. 3 is a perspective view of the chute together with its mounting devices, and Fig. 4 is a perspective view of a lower stop which limits the downward tilt of the chute in the event of spring failure.

Now referring to the drawings in greater detail, at 10 there is diagrammatically indicated the cut off head of an automatic grid manufacturing machine and which is indicated at 60 in Patent 2,759,499. This head reciprocates toward and from a track 12 which will be described shortly and in the direction of the arrows next to the head.

Fixedly mounted on the head is a pair of brackets 14 and 16 carrying between them a chute 18, pivoted on the brackets at 20, as will be described and held in counterclockwise position by a spring 22. The chute is vibrated downwardly by engagement of a roller 24 mounted on the chute engaging teeth 26 on the inclined track 12.

The bracket 14 comprises a sheet metal member with a flat plate 15 applied to the head 10 and held in adjusted position thereon through the intermediary of a conventional bolt and slot connection 28. At right angles to and integral with the plate 15 is a wing 30, the lower end of which is bent at right angles to the wing to form a seat 32; fixed on the seat is a stud 34. The chute 18 is essentially a hollow rectangular tube open at the rear to receive a grid cut off from a grid string and provided with a contracted mouth 35 at the front or free end of the tube. This mouth is formed by the side walls 36 of the tube tapering toward the free right hand end of the chute as seen in Fig. 1, and by their being inclined toward each other as indicated at 37 until near the ends of the tapered portions whereat the side walls are again bent into parallel relationship as indicated at 38. The top wall 39 of the chute, at its forward end, is inclined downwardly, as indicated at 40, and lies between the inclined portions 37 of the tube. The bottom wall of the chute terminates at the region where the walls 37 start to incline toward each other. The rear of the chute is bevelled as indicated at 42 to allow closeness of the rear end of the chute to the head 10 and yet allow for tilting motion of the chute. The bracket 16 is similar to bracket 14 except that it does not have the seat 32 and has a shorter wing than wing 30.

The chute is provided with pivot means, here shown as a sleeve 44 welded crosswise of and underneath the bottom wall of the tube and a pivot pin 46 extending through the sleeve and threaded at both ends. The pin may be held in place in suitable bearings in the wings by nuts 48 or equivalent means. The bottom wall of the chute adjacent the pivot sleeve 44 is also provided with a centrally apertured boss 50. The spring 22 is compressed with one end lying in the aperture of the boss and the other end surrounding the stud 34 on the seat 32. This spring tends to rotate the chute counterclockwise about its pivot 20. An adjustable stop 52 supported by a fixed part of the machine limits the upward tilt of the forward end of the chute. In use, the stop is so adjusted that the chute inclines slightly upwardly above the horizontal, toward the forward end thereof, when the chute is away from the track and in a position to receive a grid from the cut off head. In such inclined position, bouncing of the grid out of the forward end of the chute is inhibited by gravitational effects tending to move the grid toward the cut off head end of the chute. Should the spring 22 weaken or break, the chute will rotate into contact with a fixed angle iron 54, having one arm 56 adjustably mounted on a fixed portion of the machine and another arm 58, at right angles to the arm 56 extending crosswise of the chute at a distance beneath the same. The arm 58 is far enough below the chute to not impede normal pivotal movments of the chute as induced by the track 12 but will hold the chute against excess pivotal action, downward at the free end of the chute, to avoid damage to moving parts of the machine, as, for example, the buckets to be described.

Mounted on a fixed portion of the machine is the track 12. The track is part of a bent bar having one end 60 secured to the base by a bolt and slot connection 62 to provide for adjustment of the track toward and from the cut off head. The track itself is on a portion of the bar inclined upwardly and toward the cut off head. On approach of the chute toward the track, the roller 24 will engage the upper end of the track, and as the cut-off head continues to move forwardly, the roller will ride down the track and eventually ride over the teeth 26 which may be made as coarse as desired or extend along the track at any desired location and distance. The tilting of the mouth end of the chute downward and the vibrating of the chute due to the pressure of the teeth and the spring 22, will cause a grid in the chute to gravitate out of the same. A grid leaving the chute is illustrated in Fig. 1, and is in position over a bucket 64 which has just indexed to grid receiving position. The bucket is one of a number of equally spaced buckets on an indexible conveyor chain and travels to a position directly beneath the mouth of the chute when the chute is vibrated. On receding movement of the head and chute, the next bucket is indexed to proper position. Damage to chute or bucket due to breakage of spring 22 is prevented by stop arm 58 engaging the bottom of the chute and holding the free end of the chute above the level of the path of travel of the buckets.

Having thus described the invention what is claimed as new is:

1. An article transfer mechanism comprising a mechanism having a horizontal reciprocatory motion, a chute pivoted on a horizontal axis attached to and movable with the mechanism and in position to receive articles delivered from said mechanism, resilient means urging said chute to an article retaining position and a fixed element in the path of movement of a part fixed to the chute as it reciprocates with the mechanism, to engage said part and move the chute to another and article unloading position.

2. An article transfer mechanism comprising a mechanism having a horizontal reciprocatory motion, a chute pivoted near the mechanism end on a horizontal axis attached to and movable with the mechanism and in position to receive articles delivered from said mechanism, resilient means urging the other end of said chute upwardly to an article retaining position, a stop limiting the upward movement of the other end of the chute so that the chute is slightly inclined downwardly toward the mechanism, a fixed element in the path of movement of a part fixed to the chute as it reciprocates with the mechanism, to engage said part and move the free end of the chute downwardly to article unloading position.

3. An article transfer mechanism comprising a mechanism having a horizontal reciprocatory motion, a chute pivoted near the mechanism end on a horizontal axis attached to and movable with the mechanism and in position to receive articles delivered from said mechanism, resilient means urging the other end of said chute upwardly to an article retaining position, a stop limiting the upward movement of the other end of the chute so that the chute is slightly inclined downwardly toward the mechanism, a fixed element having a serrated under surface in the path of movement of a part fixed to the chute as it reciprocates with the mechanism, to engage said part and move the free end of the chute downwardly to article unloading position.

4. An article transfer mechanism comprising a mechanism having a horizontal reciprocatory motion, a chute pivoted near the mechanism end on a horizontal axis attached to and movable with the mechanism and in position to receive articles delivered from said mechanism, resilient means urging the other end of said chute upwardly to an article retaining position, a stop limiting the upward movement of the other end of the chute so that the chute is slightly inclined downwardly toward the mechanism, a track having a serrated under surface inclined upwardly and toward the chute, a track follower extending laterally from the chute intersecting the element in the motion of the mechanism toward the track, said engagement effecting downward movement of the free end of the chute and vibration of the chute.

5. An article transfer mechanism comprising a mechanism having a horizontal reciprocatory motion, a chute pivoted near the mechanism end on a horizontal axis attached to and movable with the mechanism and in position to receive articles delivered from said mechanism, resilient means urging the other end of said chute upwardly to an article retaining position, a stop limiting the upward movement of the other end of the chute so that the chute is slightly inclined downwardly toward the mechanism, a fixed element in the path of movement of a part fixed to the chute as it reciprocates with the mechanism, to engage said part and move the free end of the chute downwardly to article unloading position, and a fixed stop at an elevation below the chute and near the free end thereof.

6. A transfer device comprising a horizontally reciprocatable article delivery head, a chute carried thereby on a horizontal pivot located to allow the free end of the chute, remote from the head, to gravitate to a low position, a spring urging said chute to a position where the free end of the chute is slightly above the receiving end of the chute, means to pivot the free end of the chute downwardly as the head reciprocates to gravitationally eject an article carried by said head and means to vibrate the chute during the downward pivotal movement of said head, said chute being in the form of a tube, rectangular in cross section, with a mouth formed by side walls of the tube approaching each other and then becoming parallel, the top wall of the tube extending over the mouth to substantially the forward end of the approaching wall portions and the bottom wall terminating at the region where the side walls of the tube begin to approach each other.

References Cited in the file of this patent
UNITED STATES PATENTS

| 1,837,607 | Biggert | Dec. 22, 1931 |
| 1,856,976 | Strelow | May 3, 1932 |

FOREIGN PATENTS

| 20,287 | Great Britain | June 12, 1912 |